US009872247B2

United States Patent
Keskitalo et al.

(10) Patent No.: US 9,872,247 B2
(45) Date of Patent: Jan. 16, 2018

(54) POWER PREFERENCE INDICATOR TIMER

(71) Applicant: Nokia Technologies Oy, Espoo (FI)

(72) Inventors: Ilkka Keskitalo, Oulu (FI);
Jussi-Pekka Koskinen, Oulu (FI)

(73) Assignee: Nokia Technologies Oy, Espoo (FI)

(*) Notice: Subject to any disclaimer, the term of this patent is extended or adjusted under 35 U.S.C. 154(b) by 50 days.

(21) Appl. No.: 14/431,646

(22) PCT Filed: Sep. 4, 2013

(86) PCT No.: PCT/FI2013/050850
§ 371 (c)(1),
(2) Date: Mar. 26, 2015

(87) PCT Pub. No.: WO2014/049198
PCT Pub. Date: Apr. 3, 2014

(65) Prior Publication Data
US 2015/0223166 A1     Aug. 6, 2015

Related U.S. Application Data

(60) Provisional application No. 61/706,844, filed on Sep. 28, 2012.

(51) Int. Cl.
*H04W 52/02* (2009.01)
*H04W 76/04* (2009.01)
(Continued)

(52) U.S. Cl.
CPC ... *H04W 52/0212* (2013.01); *H04W 52/0216* (2013.01); *H04W 76/022* (2013.01);
(Continued)

(58) Field of Classification Search
CPC .................................................. H04W 52/0212
See application file for complete search history.

(56) References Cited

U.S. PATENT DOCUMENTS

2004/0038681 A1   2/2004   Chun
2008/0232310 A1   9/2008   Xu
(Continued)

FOREIGN PATENT DOCUMENTS

EP    2079269        7/2009
JP    2014-045447 A  3/2014
(Continued)

OTHER PUBLICATIONS

R2-124364 Change Request, ZTE Corporation, "Introduction of Power preference indication", Aug. 13-17 2002, 3GPP TSG-RAN WG2 Meeting #79.*

(Continued)

*Primary Examiner* — Jason Mattis
(74) *Attorney, Agent, or Firm* — Mintz Levin Cohn Ferris Glovsky and Popeo, P.C.

(57) ABSTRACT

In accordance with the exemplary embodiments of the invention there is at least a method and an apparatus to perform operations including starting, by a device of a communications network, a timer in response to a radio resource control message, where a power preference indication message is not sent by the device for at least a duration of the timer.

21 Claims, 5 Drawing Sheets

(51) Int. Cl.
*H04W 76/02* (2009.01)
*H04W 84/12* (2009.01)

(52) U.S. Cl.
CPC ...... *H04W 76/041* (2013.01); *H04W 52/0229* (2013.01); *H04W 84/12* (2013.01); *Y02B 60/50* (2013.01)

(56) References Cited

U.S. PATENT DOCUMENTS

| | | | |
|---|---|---|---|
| 2009/0238098 | A1 | 9/2009 | Cai et al. |
| 2011/0199910 | A1 | 8/2011 | Oh et al. |
| 2011/0199984 | A1 | 8/2011 | Umesh et al. |
| 2012/0120843 | A1 | 5/2012 | Anderson et al. |
| 2014/0018085 | A1* | 1/2014 | Young ............... H04W 52/0235 455/450 |
| 2014/0036750 | A1 | 2/2014 | Yavuz et al. |
| 2014/0044029 | A1* | 2/2014 | Chou ............... H04W 52/0212 370/311 |
| 2015/0195753 | A1* | 7/2015 | Jung ............... H04W 36/0055 370/331 |

FOREIGN PATENT DOCUMENTS

| | | |
|---|---|---|
| JP | 2015-530017 A | 10/2015 |
| KR | 2011-0083706 A | 7/2011 |
| RU | 2433544 C2 | 11/2011 |
| WO | 2010/054391 A2 | 5/2010 |
| WO | WO-2011157364 A1 | 12/2011 |
| WO | 2014/020569 A1 | 2/2014 |
| WO | 2014/034538 A1 | 3/2014 |
| WO | 2014/037609 A1 | 3/2014 |

OTHER PUBLICATIONS

"LTE;Evolved Universal Terrestrial Radio Access (E-UTRA);Radio Resource Control (RRC);Protocol specification", ETSI TS 136 331, V11.1.0, Nov. 2012, pp. 1-328.

"PPI transmission", 3GPP TSG-RAN WG2 Meeting #79bis, R2-12xxxx, Agenda item: x.x.x, Nokia Corporation, Oct. 8-12, 2012, 3 Pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.0.0, Jun. 2012, pp. 1-302.

Office action received for corresponding Singapore Patent Application No. 11201502345U, dated Dec. 30, 2015, 7 pages.

Office action received for corresponding Japanese Patent Application No. 2015-533647, dated Mar. 10, 2016, 6 pages of office action and No page of office action translation available.

"Summary of Email Discussion [78#43] LTE/EDDA: Power Preference Indication", 3GPP TSG-RAN WG2 Meeting #79, R2-123413, Agenda item: 7.2.2.1, ZTE, Aug. 13-17, 2012, 21 pages.

"Further Details On UE Assistance For Power Preference", 3GPP TSG-RAN WG2 #79, R2-123763, Agenda Item: 71.2.1, Ericsson, Aug. 13-17, 2012, pp. 1-3.

"Details Of Power Preference Indication", 3GPP TSG-RAN WG2 Meeting #79, R2-123732, Agenda item: 7.2.2.1, Research In Motion UK Limited, Aug. 13-17, 2012, 5 pages.

Extended European Search Report received for corresponding European Patent Application No. 13841457.8, dated Apr. 28, 2016, 7 pages.

"Introduction Of Power Preference Indication", 3GPP TSG-RAN WG2 Meeting #79, R2-124364, Current version: 11.0.0, ZTE Corporation, Aug. 13-17, 2012, 18 pages.

"Introduction Of Power Preference Indication (Option a + RRC Signalling)", 3GPP TSG-RAN WG2 Meeting #79, R2-123414, Current version: 11.0.0, ZTE, Aug. 13-17, 2012, 18 pages.

International Search Report and Written Opinion received for corresponding Patent Cooperation Treaty Application No. PCT/FI2013/050850, dated Jun. 2, 2011, 12 pages.

Office action received for corresponding Korean Patent Application No. 2015-7010990, dated Mar. 11, 2016, 6 pages of office action and no pages of office action translation available.

"3rd Generation Partnership Project; Technical Specification Group Radio Access Network; Evolved Universal Terrestrial Radio Access (E-UTRA); Radio Resource Control (RRC);Protocol specification (Release 11)", 3GPP TS 36.331, V11.1.0, Sep. 2012, pp. 1-325.

* cited by examiner

Figure 5.3.15.1-1: UE Assistance Information

Figure 5.3.5.1-1: RRC connection reconfiguration, successful

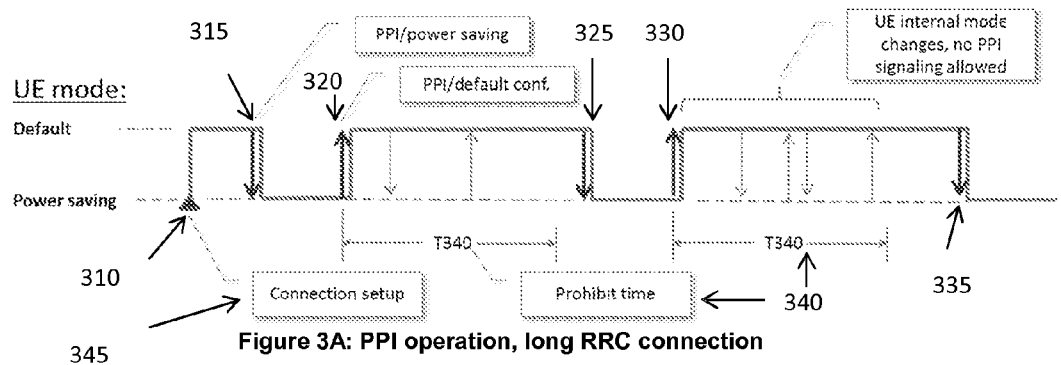
Figure 3A: PPI operation, long RRC connection
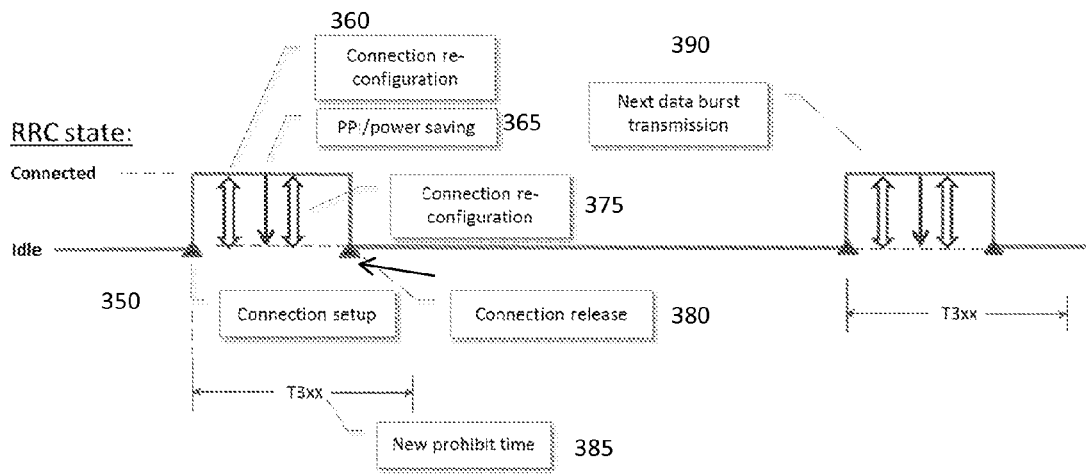
Figure 3B: Operation with smart phone traffic 510 starting, by a device of a communications network, a timer in response to a radio resource control message, where a power preference indication message is not sent by the device for at least a duration of the timer

Figure 5

POWER PREFERENCE INDICATOR TIMER

RELATED APPLICATION

This application was originally filed as PCT Application No. PCT/FI2013/050850 filed Sep. 4, 2013 which claims priority benefit from U.S. Provisional Application No. 61/706,844, filed Sep. 28, 2012.

TECHNICAL FIELD

The teachings in accordance with the exemplary embodiments of the invention relate to enhanced diverse data applications (eDDA), and RRC connected modes and for user equipment with sparse/infrequent data transmission. The exemplary embodiments of the invention at least provide a DRX, mobility, signaling load, and network connection release timer.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ARQ automatic repeat-request
CQI channel quality indication
C-RNTI cell radio network temporary identifier
DRB data radio bearer
DRX discontinuous reception
DL downlink
eDDA enhancements for diverse data application
eNB base station
HARQ hybrid automatic repeat-request
HFN hyper frame number
IDC in-device co-existence
IE information element
NAS non-access stratum
Node B base station in UTRAN
MAC medium access control layer
PDCP packet data convergence protocol layer
PHY physical layer
PPI power preference indication
QoS quality of service
RACH random access channel
RAN radio access network
RLC radio link control
RN relay node
RPLMN registered public land mobile network
RRC radio resource control
RS reference signal
SDU service data unit
SFN system frame number
SMC security mode command
SN serving network
UE user equipment A long-term evolution (LTE) system, initiated by the third generation partnership project (3GPP), is a radio interface and network architecture that provides high data rates, low latency, and packet optimization with improved system capacity and coverage. In the LTE system, an evolved universal terrestrial radio access network (EUTRAN) includes a plurality of evolved Node-Bs (eNBs) and communicates with a plurality of mobile stations, also referred to as user equipment (UE). The radio protocol stacks of E-UTRAN includes a radio resource control layer (RRC), a packet data convergence protocol layer (PDCP), a radio link control layer (RLC), a medium access control layer (MAC), and a physical layer (PHY).

Radio resource control (RRC) signaling can include RRC connection reconfiguration signaling used by eNBs and UEs to modify a RRC connection, such as to establish/modify/release the RRC connection, to perform handover, to setup/modify/release measurements, and to establish/modify/release radio bearers. RRC states include a RRC Idle state where user equipment is not actively communicating with a radio access network, and RRC Connected state where the radio is active and connected to an eNB. The eNB has a downlink signaling configurations determining the time instants where the UE shall receive the scheduling and paging information. For power saving purposes, an eNB may configure time periods when the UE shall monitor downlink control signals. During other times the UE is allowed to go to power saving mode during which eNB cannot assume that the UE would listen for downlink signals. This relates to a discontinuous reception (DRX) period, which causes the UE to shut off its radio for periods of time to save power.

As coverage of data networks has increased, such as including WiFi networks, the demand for diverse smartphone applications also have increased. The significant amount of mobile applications present challenges to connectivity and power savings operations of the devices in view of the ubiquitous nature of these applications. One such challenge relates to these mobile applications running in the background on a UE which tend to require an always on connection with the network.

SUMMARY

In an exemplary aspect of the invention, there is a method comprising: starting, by a device of a communications network, a timer in response to a radio resource control message, where a power preference indication message is not sent by the device for at least a duration of the timer.

In another exemplary aspect of the invention, there is an apparatus comprising: at least one processor; and at least one memory including computer program code, where the at least one memory and the computer program code are configured, with the at least one processor, to cause the apparatus to at least: start a timer in response to a radio resource control message, where a power preference indication message is not sent by the device for at least a duration of the timer.

In yet another exemplary aspect of the invention, there is an apparatus comprising: means for starting a timer in response to a radio resource control message, where a power preference indication message is not sent by the device for at least a duration of the timer.

In accordance with the exemplary aspect of the invention as in the paragraph above, the means for starting comprises a timer, and a computer readable medium including computer program code, the computer program code executed by at least one processor.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 3A illustrates a PPI operation with a long RRC connection;

FIG. 3B illustrates connectivity mode operations using a timer, in accordance with the exemplary embodiments of the invention;

FIG. 5 illustrates a simplified block diagram of a method in accordance with the exemplary embodiments of the invention.

DETAILED DESCRIPTION

In accordance with the exemplary embodiments of the invention there is at least a method to provide enhanced diverse data applications (eDDA) and power savings for UE RRC connected modes with sparse and/or intermittent data transmissions by the data applications. The exemplary embodiments of the invention provide at least a method for a DRX, mobility, signaling load, and/or network connection release timer.

In order to optimize UE power savings, embodiments of the invention provide techniques to keep the UE and network synchronized in whichever power mode the UE is in to at least allowing successful background application data traffic. These techniques, as will be discussed in detail below, include a capability for the UE to provide power preference indications in an RRC procedure to a network device, such as an eNB, and a new timer for use in a timing of the power preference indications from the UE.

One specification of interest is 3GPP TS 36.331 V11.0.0 (2012-06) 3$^{rd}$ Generation Partnership Project; Technical Specification Group Radio Access Network; Evolved Universal Terrestrial Radio Access (E-UTRA); Radio Resource Control (RRC); Protocol specification (Release 10), incorporated by reference herein in its entirety.

Figure 1A:
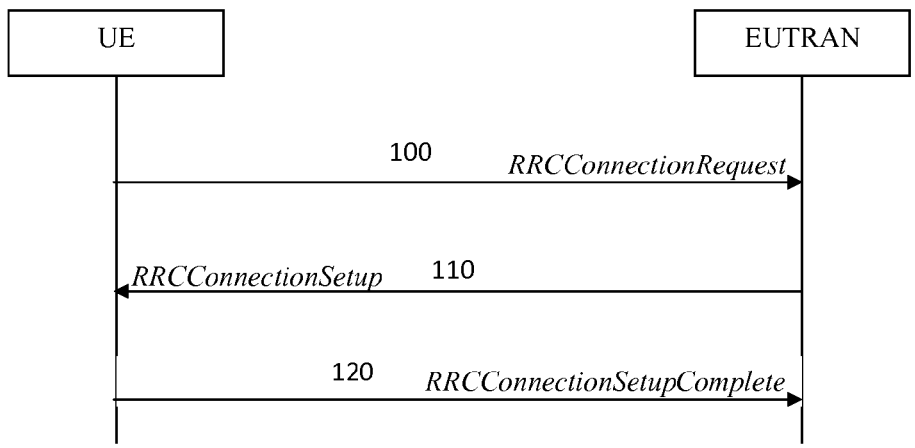
FIG. 1A is a conventional signaling diagram illustrating a successful RRC connection establishment.

FIG. 1A reproduces FIG. 5.3.5.1-1 of 3GPP TS 36.331, and shows the overall RRC connection establishment procedure. As illustrated in FIG. 1A, the UE starts the radio resource control (RRC) connection. The UE sends an RRCConnectionRequest message 100 requesting RRC connection setup to evolved universal terrestrial radio access network (EUTRAN) device(s), such as an eNB. The EUTRAN device(s) sets up a radio link and sends the UE an RRCConnectionSetup message 110, the message comprising physical channel information. After the UE has synchronized itself with the EUTRAN, it transmits an acknowledgement RRCConnectionSetupComplete message 120, and the UE may then send higher-layer messages, such as a call setup message.

Figure 1B:
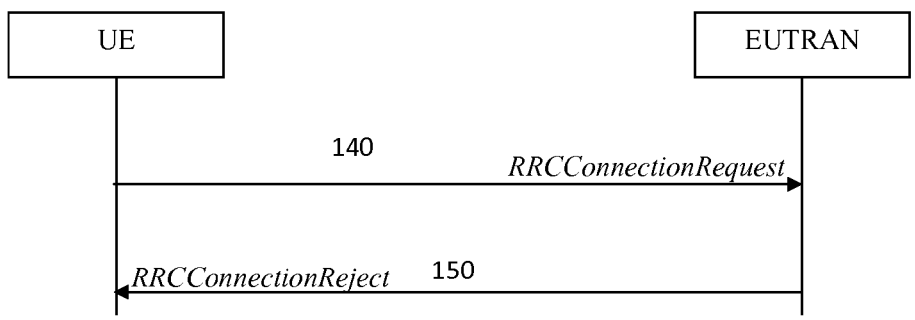
FIG. 1B is a conventional signaling diagram illustrating network reject of an RRC connection establishment procedure.

FIG. 1B reproduces FIG. 5.3.5.1-2 of 3GPP TS 36.331, and shows the overall RRC network reject procedure. FIG. 1B illustrates an example of an RRC connection failure. The EUTRAN device(s) can fail an attempt to set up a radio link. Such a failure can be due to hardware blocking, or an admission control can reject a setup attempt. In such a situation, in response to an RRCConnectionRequest message 140 the EUTRAN device transmits an RRCConnectionReject message 150.

Figure 2A:
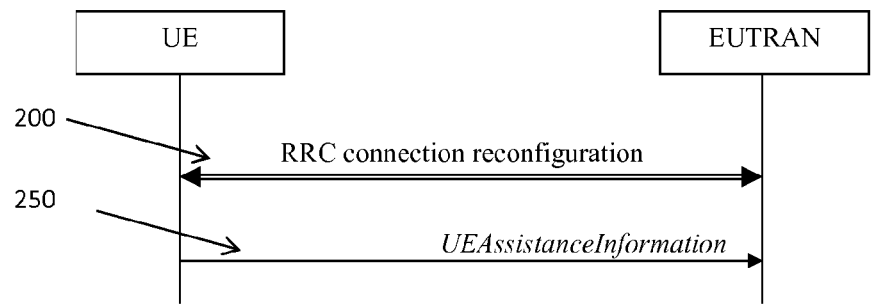
FIG. 2A illustrates a communication of UE assistance information signaling between an E-UTRAN network and a UE.

FIG. 2A illustrates a communication of UE assistance information between an E-UTRAN network and a UE in response to an RRC connection reconfiguration procedure. As shown in FIG. 2A at line 200 the EU and EUTRAN exchange RRC connection reconfiguration signaling. Then at line 250 the UE send UE assistance information to the EUTRAN. The purpose of this procedure is to inform E-UTRAN of assistance information, which may include the UE's power saving preference. Otherwise E-UTRAN may assume that the UE prefers a default configuration for power saving initially when it configures and enables the UE for power preference indication. The novel operations as discussed herein works to reduce signaling related to such RRC and power saving preference signaling.

Figure 2B:
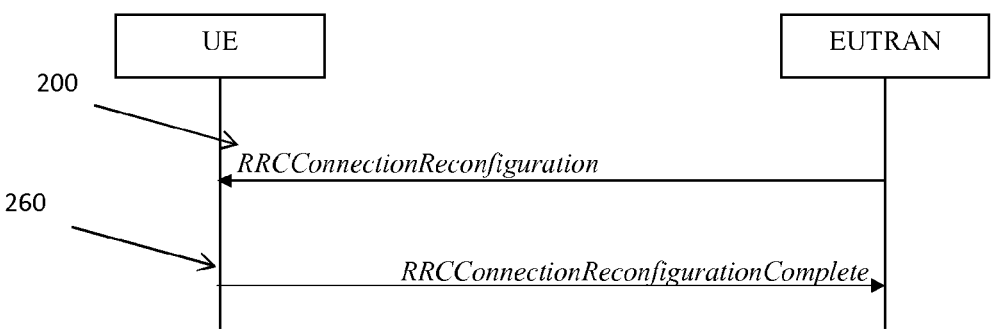
FIG. 2B illustrates RRC connection reconfiguration signaling relevant to the method in accordance with the exemplary embodiments of the invention.

FIG. 2B illustrates an RRC connection reconfiguration operation as discussed in 3GPP TS 36.331 V11.0.0. The exemplary embodiments of the invention as discussed herein include a modification of an RRC connection, such as the signaling shown in FIGS. 2A and 2B pertaining to 3GPP TS 36.331 V11.0.0 and more particularly section 5.3.5 of 3GPP TS 36.331. This RRC reconfiguration procedure is to establish/modify/release RBs, to perform handover, to setup/modify/release measurements, to add/modify/release SCells. As part of the procedure, NAS dedicated information may be transferred from E-UTRAN to the UE. As shown in FIG. 2B at line 200 the EU and EUTRAN exchange RRC connection reconfiguration signaling. Then as shown in line 260 the UE signals an RRCConnectionComplete message to the EUTRAN. Section 5.3.5 of 3GPP TS 36.331 includes further description of signaling performed before the RRC connection reconfiguration is complete. The embodiments of the invention relate to power preference indication (PH) signaling and a timer for use in at least the communications involved in RRC related signaling such as shown in FIGS. 2A and 2B. The novel operations as discussed herein using the signaling and timer benefiting at least the UE and the network operator by reducing the signaling using a power preference indication (PPI) timer in accordance with the embodiments of the invention.

A problem addressed here relates to signaling optimization for powerPrefIndication (PPI) and how to keep the UE and network synchronized which mode the UE is in at each time instant. PPI is a one bit indication and the assumption has been that there is a "default" configuration when there is no specific reason to try to achieve reduced power consumption at the UE. In such situation the connection configuration and state control can be based on QoS requirements for example. This "default" configuration is sent by the network after the connection has been set up.

The PPI indication is restricted to lowpowerconsumption value only when sent for the first time after connection setup. The network assumes the UE being in the normal or 'default' mode when new data transfer starts after the UE was in idle state. This is captured in the latest change request CR (in 3GPP TS 36.331 5.3.15.1) with the statement:

E-UTRAN may assume that the UE prefers a default configuration for power saving initially when it configures and enables the UE for power preference indication.

If the traffic is generated by applications actively used by a user of a UE, such as smart phone applications, the default configuration should be suitable to carry the data with a targeted QoS. On the other hand, if for example traffic is from applications running in the background such as monitoring email, status updates for instant message service and/or social networking, the UE can send a PPI indicating a value of lowpowerconsumption, provided that the PPI signaling is allowed by the network. This lowpowerconsumption indication enables the UE to trigger a connection re-configuration for lower power consumption while still enabling data traffic from applications running in the background on the UE.

Following the principle of restricting the first PPI indication to lowpowerconsumption only there will be a reduction of required UE assistance signaling. This is for at least the reason that PPI signaling can be avoided in all cases where the power consumption is not a priority for the connection configuration. By this, the signaling load can be reduced as only other values associated with the assistance information need be sent.

Further, in accordance with the invention a RAN#57 approved change request for 3GPP TS 36.331 regarding a power preference indication is as follows: 5.3.15.2 Initiation A UE capable of providing power preference indications in RRC_CONNECTED may initiate the procedure only if
 the received powerPrefIndicationConfig includes the powerPrefindication-Enabled; and
  the UE did not indicate any power saving preference since last entering RRC_CONNECTED on the current Pcell, or the current UE preference is different from the one indicated in the last transmission of the UEAssistanceInformation message to the current Pcell; and
  timer T340 is not running.
Upon initiating the procedure, the UE shall:
 if the UE prefers a default configuration for power saving:
 start timer T340 with the timer value set to the power-Prefindication-Timer; and
 initiate transmission of the UEAssistanceInformation message in accordance with 5.3.15.3 OF 3GPP TS 36.331;

According to the agreed specification text, signaling load can be reduced by using the prohibit timer T340 which prevents the UE from sending its next indication with the value lowpowerconsumption. The prohibit timer T340 is started when a PPI is sent with "default" mode as the value (after being in the power optimized mode). The prohibit time mechanism is illustrated in FIG. 3A where the underlying assumption is that the UE is kept in the RRC connected state either due to long data transmission or a long connection release timer (e.g., a network parameter to control the RRC connection releases).

There are two basic scenarios that should be considered regarding the time restriction for the power preference indication, namely: a) UE is kept continuously connected (e.g., with a long connection release timer) or b) the connection is released soon after data burst transmission.

FIG. 3A illustrates a current PPI/power saving operation or low power preference at 315 with a long RRC connection using a prohibit timer T340 340. As shown in FIG. 3A the prohibit timer 340 is started only at the last PPI transmission 320 indicating a PPI/default configuration, i.e., not a low power optimized configuration. In this case currently specified prohibit timer (T340) works well and is able to reduce the signaling load by avoiding excessive PPI signaling procedures due to frequent changes between default and power saving modes. T340 is a configurable timer where the values range between 0 (zero)-600 s. Zero value means that there is no filtering of PPI indications. The T340 timer is started only in the case when the UE sends the PPI preferring a default configuration. Usage of a single prohibit timer (T340) should be able to eliminate excessive signalling and the impact to user experience due to PPI transmission. The problem of not starting prohibit timer at other times is the possible overhead that is caused by excessive signalling caused by the consecutive PPIs, but the benefit of such approach is that when UE requires configuration meeting the QOS targets they can be requested quickly and service is not degraded.

In accordance with an exemplary embodiment of the invention there is an improved prohibit mechanism with another timer that is related to RRC procedures and started when the RRC connection is set up. Allowing PPI any time after the connection setup may result in a prohibitively large signaling load without any, or even with negative, impact on UE power consumption. With the new timer (T3xx) excessive signaling will be avoided and the smart phone operation in the "background" mode can be optimized.

In accordance with the exemplary embodiments, an RRC message sending prohibit mechanism would be enhanced so that a new prohibit timer (T3xx) is started also at configuration of the feature (e.g. PPI, IDC etc.) Configuration of this novel feature may happen for example (e.g., in LTE case) by RRC Connection Reconfiguration (with or without mobility control info), RRC connection Setup, and RRC connection Reestablishment etc. The new timer value could be signaled, statically specified or could be in relation to other timer values (e.g., T340 in case of PPI) plus/minus/divided/multiplied with some value.

In this case, the connection may be activated just to send a small packet e.g. when the running applications are generating only background traffic (this can be typical traffic generated by smart phones). For just a short connection it is does not make sense to initiate the PPI signaling procedure if the connection is soon to be released. FIG. 3B illustrates such a scenario.

To avoid such problem, there is proposed the new timer for the transmission of the PPI with value lowpowerconsumption (which indication is likely for background traffic) which would be started in the beginning of the connection setup, at or during the connection set up procedure, and at or during the connection re-configuration signaling following the connection set up signaling procedure. The new timer could in principle be also a fixed value specified in the RRC specification. In addition, the new timer can be variable, such as dependent on signaling conditions.

Another option, instead of a timer usage, to prevent unnecessary PPI indication would be to use the amount of data in the buffer whether to send the indication or not. If there is only small amount of data in the buffer the PPI signaling can be delayed. There could be a specific threshold for the amount of data in the buffer whether to start the PPI signaling or not. Similarly to T3xxx the threshold can be configurable by the network, or the threshold can be fixed in the specification. The buffer status works for user equipment generated data but is not applicable for data transfer coming from the network.

The configurability of the timer T3xx allows adaptation to different operating scenarios. The configurable values for the new T3xx timer can start from "0" allowing also immediate PPI indication if the network so wishes. When/if configurable, the new timer can have a separate information element (IE) in the configuration message, or it can be related to the T340 configuration. In the latter case, the value of the new timer can be the same as T340 value so that there would be only one value configured which would be applied for both timers, T3xx and T340. Alternatively, the value used for T3xx can be derived from the configured T340 value e.g.

being a fraction or multiple of that, T340 value subtracted or added by a constant, or the like. If there is a separate IE for the T3xx it will be applied as such. The network may set the time period for T3xx to align with the length of the connection release timer applied for that particular connection so that the prohibit time (value of the T3xx) would be somewhat longer than the release timer in order not to expire before the connection release. Then if there is no new data (after the initial data packet), the connection will be released at the expiry of the connection release timer and when the T3xx has not expired. This will prevent the PPI signaling during the whole time period when there is RRC connection for the data packet/burst transmission. Alternatively, the release timer value can be signaled in other messages, either in broadcast or dedicated signaling to be used as the basis for setting the value of T3xx. The used T3xx value should obviously be the release time plus some time margin in order to prevent T3xx expiry prior to release timer expiry. The margin could also be a fixed value or configurable.

FIG. 3B illustrate a method using a new T3xx timer (385) in accordance with the exemplary embodiments of the invention. FIG. 3B illustrates a situation with frequent RRC state transitions and with intermittent (small data packet—which is typical for smart phones with applications running on the "background") transmission. In accordance with the exemplary embodiments, the network assumes or reconfigures 360 the UE to a default power mode after the RRC connection 350 is set up. The PPI signaling is enabled during this signaling procedure. Without the new timer T3xx 385, if the UE is in "background" mode and power saving is preferred (this can last for several hours e.g. during the nights), and the PPI signaling is enabled, UE will send a PPI 365 with value indicating lowpowerconsumption. The RAN node may then start a RRC connection re-configuration 375 signaling procedure in order to change the connection parameters to maximize the power saving. When the new prohibit timer T3xx 385 is used, the UE is not sending the PPI while T3xx is running and there will not be consequent connection re-configuration initiated by the network. The new PPI prohibit timer T3xx 385 may run beyond the connection release 380 hence avoiding the PPI and re-configuration signaling procedures during this (short) connection time. During the next data burst transmission 390 the signaling reduction with the new PPI prohibit timer 385 can again be achieved.

The same procedures described above may be repeated in the following connections as the PPI "configuration" may be deleted when the connection is released. This sequence will happen according to the traffic pattern that the (background) data transfer happens. The interval can be as short as mere seconds resulting in an unacceptably high load in RRC signaling with only a very small amount of traffic payload that is transferred. Furthermore, with short connection times the power optimized configuration can have only marginal improvement, which can become even negative due to excessive signaling procedures.

Several implementation mechanisms for the timer T3xx are possible, but some examples are briefly described. Prohibit timer T3xx:

is a completely new timer which may be configured the same way as T340 or in another configuration message
can be a fixed time defined in the specification
can be informed by broadcasted messages
can be the same or have the same value as configured T340
can be derived from T340, e.g. certain fraction or T340, T340+1—suitable value, or the like can be based on the data buffer status, only if the buffered data amount exceeds a certain threshold the UE is allowed to send the PPI indication
If the data amount is lower than a given threshold, UE can start the prohibit timer for PPI transmission
the data amount in the buffer may be used as such, i.e. without using a timer, to prohibit the PPI signaling; if the data amount is lower than a given threshold, the UE will suspend the PPI signaling as long as there is not new data arriving (and exceeding the given threshold), if sufficient amount of new data arrives, and power optimization is preferred, the UE can send the PPI this may be limited to UE initiated data transfer where the UE is aware of the data in the transfer buffer
may be started only if the PPI indication is enabled
The exemplary embodiments of the invention provide at least the advantages:
signaling load will be minimized particularly for smart phones operating in background mode, or, generally when only intermittent data transfer occur;
negative impacts on UE power consumption are overcome
can be implemented with a simple mechanism with only minor specification impact;
the embodiments of the invention can be specified on top of an already agreed prohibit mechanism.

Figure 4:
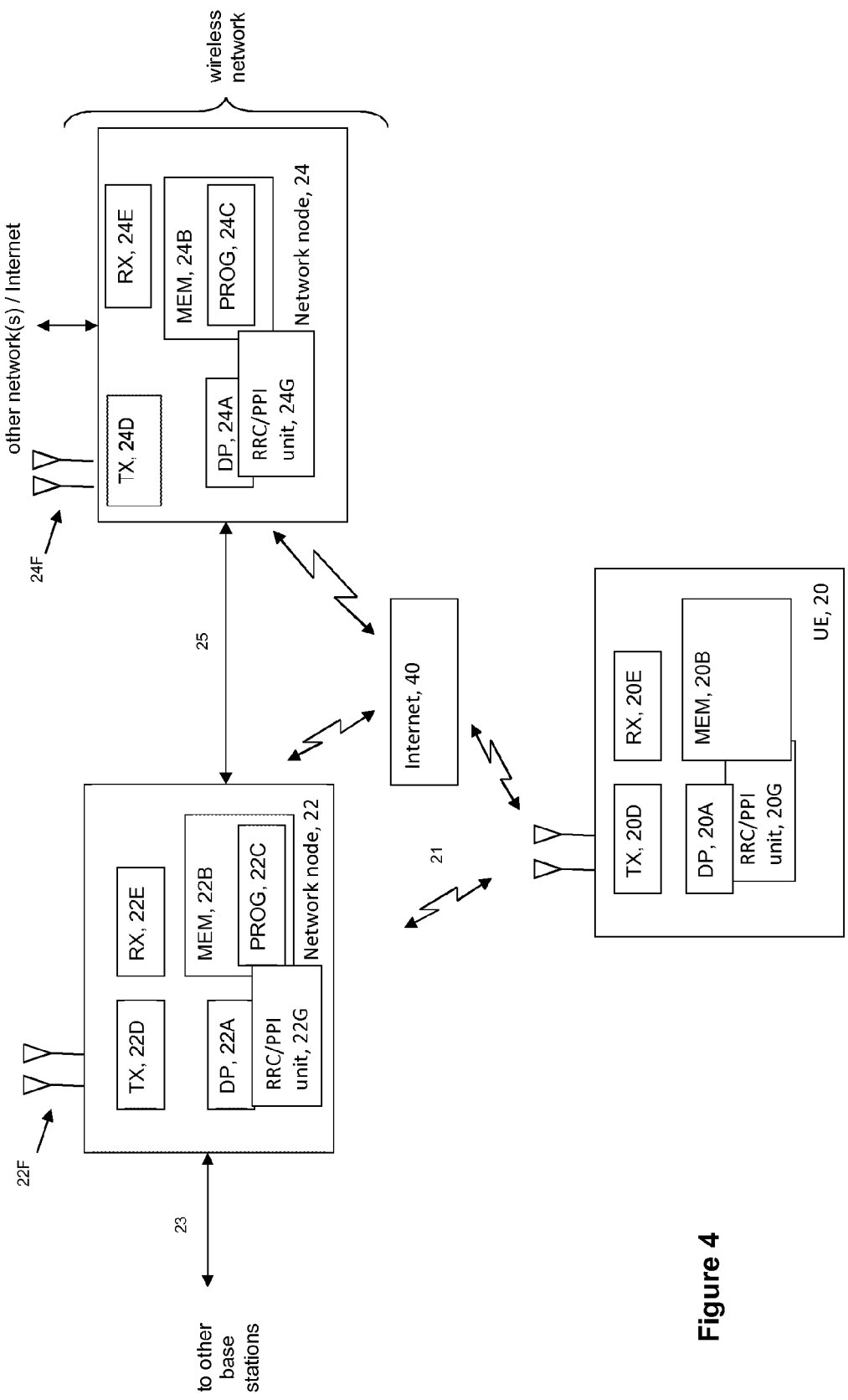
FIG. 4 illustrates a simplified block diagram of various electronic devices that are suitable for use in practicing the exemplary embodiments presented herein.

FIG. 4 illustrates a simplified block diagram of various electronic devices and apparatus that are suitable for use in practicing the exemplary embodiments of this invention. In FIG. 4 a wireless network (network access node 22, and higher network node 24) is adapted for communication over wireless link 21, and possibly link 23, with an apparatus, such as a mobile terminal or UE 20. The higher network node 24 may be implemented in the LTE system as a mobility management entity (MME) which provides connectivity with further networks (e.g., publicly switched telephone networks (PSTNs) or a data communications network/Internet). In addition, the wireless link 21 may be used by applications running in the background on the UE 20. These applications may be performing sparse/infrequent data transmission via the network node 22 or another network node and the Internet 40.

The UE 20 includes processing means such as at least one data processor (DP) 20A, storing means such as at least one computer-readable memory (MEM) 20B storing at least one computer program (PROG) 20C or more generally computer program code, communicating means such as a transmitter TX 20D and a receiver RX 20E for bidirectional wireless communications with the node B 22 via one or more antennas 20F. Further, stored in the MEM 20B, for at least the RRC/PPI unit 20G, is at least the information related to exemplary embodiments of the invention including means for initiating an RRC establishment with a network node and providing connection information to the network node, such as the network node 22, and means for implementing a RRC/PPI timer 200 for a transmission of a PPI with a value of lowpowerconsumption which will be started at RRC connection setup and/or reconfiguration.

The network access node 22 also includes processing means such as at least one data processor (DP) 22A, storing means such as at least one computer-readable memory (MEM) 22B storing at least one computer program (PROG) 22C or more generally computer program code, and communicating means such as a transmitter TX 22D and a receiver RX 22E for bidirectional wireless communications with at least the UE 20 via one or more antennas 22F.

Further, also stored in the MEM 22B, for at least the RRC/PPI unit 22G, is the information related to the exemplary embodiments including receiving the information comprising the mobility state of the UE 20, as well as programming code executable for implementing a RRC/PPI timer 22G for a reception of a PPI with a value of lowpowerconsumption at RRC connection setup and/or reconfiguration, in accordance with the exemplary embodiments of the invention.

Similarly, the higher network node 24 includes processing means such as at least one data processor (DP) 24A, storing means such as at least one computer-readable memory (MEM) 24B storing at least one computer program (PROG) 24C or more generally computer program code, and communicating means for bidirectional communications with at least the network access node 22 via the data/control path 25. Further, similar to the network access node 22, stored in the MEM 24B, for at least the RRC/PPI unit 24G, is the information related to the exemplary embodiments of the invention including receiving information comprising a mobility state of UE, should the need arise for the higher network node 24 to have this information, as well as computer program code configured to cause the higher network node 24 to receive information comprising a PPI with a value of lowpowerconsumption sent by the UE 20, as in accordance with the exemplary embodiments of the invention. While not particularly illustrated for the UE 20 or network node 22 each of those devices are also assumed to include as part of their wireless communicating means which may be inbuilt on a radiofrequency RF front end chip within those devices 20 and 22 and which chip also carries the TX 20D/22D and the RX 20E/22E.

At least one of the PROGs 20C in the UE 20 is assumed to include program instructions that, when executed by the associated DP 20A, enable the device to operate in accordance with the exemplary embodiments of this invention, as detailed more fully above. In this regard the exemplary embodiments of this invention may be implemented at least in part by computer software stored on the MEM 20B which is executable by the DP 20A of the UE 20, or by hardware, or by a combination of tangibly stored software and hardware (and tangibly stored firmware). Electronic devices implementing these aspects of the invention need not be the entire UE 20, but exemplary embodiments may be implemented by one or more components of same such as the above described tangibly stored software, hardware, firmware and DP, or a system on a chip SOC or an application specific integrated circuit ASIC or a digital signal processor DSP or a subscriber identity module commonly referred to as a SIM card.

In general, the various embodiments of the UE 20 can include, but are not limited to: cellular telephones; data cards, USB dongles, personal portable digital devices having wireless communication capabilities including but not limited to laptop/palmtop/tablet computers, digital cameras and music devices, and Internet appliances.

Various embodiments of the devices in FIG. 4, such as the computer readable memories MEM 20B, MEM 22B, and MEM 24B, include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A include but are not limited to general purpose computers, special purpose computers, microprocessors, digital signal processors (DSPs) and multi-core processors.

It is noted that the use of the term "T340" to identify the tinier whose operations are described above is non-limiting. In accordance with the exemplary embodiments of the invention the T340 timer, as described above, can be identified using a different type of labeling and/or name.

FIG. 5 illustrates a simplified block diagram of a method in accordance with the exemplary embodiments of the invention. In regards to FIG. 5, at block 510 there is a step of starting, by a device of a communications network, a timer in response to a radio resource control message, where a power preference indication message is not sent by the device for at least a duration of the timer In accordance with the exemplary embodiments of the invention as described in the paragraph above, the radio resource control message relates to one of a radio resource connection setup procedure and a radio resource connection re-configuration procedure associated with the device.

In accordance with the exemplary embodiments of the invention as described in the paragraphs above, the timer is started based on an indication that the one of the radio resource connection setup procedure and the radio resource connection re-configuration is completed.

In accordance with the exemplary embodiments of the invention as described in the paragraphs above, the indication comprises one of a radio resource connection setup completion message and a radio resource connection re-configuration completion message.

In accordance with the exemplary embodiments of the invention as described in the paragraphs above, the one of the radio resource connection setup procedure and the radio resource connection re-configuration procedure relates to a handover operation.

In accordance with the exemplary embodiments of the invention as described in the paragraphs above, a duration of the timer is set based on information received from the communication network.

In accordance with the exemplary embodiments of the invention as described in the paragraphs above there is, based on an expiration of the timer, sending a power preference indication message towards the network.

In accordance with the exemplary embodiments of the invention as described in the paragraphs above, the power preference indication message comprises a powerprefindication value.

In accordance with the exemplary embodiments of the invention as described in the paragraphs above, the powerprefindication value indicates that the device is in one of a low power consumption mode or a normal power consumption mode.

In accordance with the exemplary embodiments of the invention as described in the paragraphs above, where starting the timer comprises restarting a T340 timer.

In accordance with the exemplary embodiments of the invention as described in the paragraphs above, a duration of the timer is based on a duration of the T340 timer.

In accordance with the exemplary embodiments of the invention there is at least a computer readable medium, such as memories 20B, 22B, and/or 24B embodying computer programs code, the computer program code executable by at least one of the data processors 20A, 22A, and/or 24A to perform at least the operations as described in the paragraphs above.

In accordance with the exemplary embodiments of the invention there is an apparatus comprising: means for starting a timer in response to a radio resource control message, where a power preference indication message is not sent by the device for at least a duration of the timer.

In accordance with the exemplary aspect of the invention as in the paragraph above, the means for starting comprises a timer, and a computer readable medium including computer program code, the computer program code executed by at least one processor.

In addition, various modifications and adaptations to the foregoing exemplary embodiments of this invention may become apparent to those skilled in the relevant arts in view of the foregoing description. While the exemplary embodiments have been described above in the context of the EUTRAN system, it should be appreciated that the exemplary embodiments of this invention are not limited for use with only this one particular type of wireless communication system, and that they may be used to advantage in other wireless communication systems such as for example GERAN, UTRAN and others.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
receiving, at a device of a communication network and prior to sending a power preference indication message, a radio resource control message; and
starting, by the device of the communications network and in response to the receiving of the radio resource control message, a power preference indication delay timer, the power preference indication delay timer prohibiting a power preference indication message from being sent by the device for at least a duration of the power preference indication delay timer.

2. The method according to claim 1, wherein the radio resource control message relates to one of a radio resource connection setup procedure and a radio resource connection re-configuration procedure associated with the device.

3. The method according to claim 2, wherein the power preference indication delay timer is started based on an indication that one of the radio resource connection setup procedure and the radio resource connection re-configuration is completed.

4. The method according to claim 3, wherein the indication comprises one of a radio resource connection setup completion message and a radio resource connection re-configuration completion message.

5. The method according to claim 2, wherein one of the radio resource connection setup procedure and the radio resource connection re-configuration procedure relates to a handover operation.

6. The method according to claim 1, wherein the duration of the power preference indication timer is set based on information received from the communication network.

7. The method according to claim 1, further comprising: based on an expiration of the power preference indication timer, sending a power preference indication message towards the network.

8. The method according to claim 7, wherein the power preference indication message comprises a powerprefindication value, the powerprefindication value indicating that the device is in one of a low power consumption mode and a normal power consumption mode.

9. The method according to claim 1, wherein starting the power preference indication timer comprises restarting a T340 timer.

10. A non-transitory computer-readable storage medium encoded with a computer program code, the computer program code executable by a processor to perform actions comprising:
receiving, at a device of a communication network and prior to sending a power preference indication message, a radio resource control message; and
starting, by the device of the communications network and in response to the receiving of the radio resource control message, a power preference indication delay timer, the power preference indication delay timer prohibiting a power preference indication message from being by the device for at least a duration of the power preference indication delay timer.

11. An apparatus comprising:
at least one processor; and
at least one memory including computer program code, wherein the at least one memory and the computer program code are configured, with the at least one processor, to cause the apparatus to at least:
   receive, at the apparatus and prior to sending a power preference indication message, a radio resource control message; and
   start a power preference indication delay timer in response to the receipt of the radio resource control message, the power preference indication delay timer prohibiting a power preference indication message from being sent by the apparatus for at least a duration of the power preference indication delay timer.

12. The apparatus according to claim 11, wherein the radio resource control message relates to one of a radio resource connection setup procedure and a radio resource connection re-configuration procedure associated with the device.

13. The apparatus according to claim 12, wherein the power preference indication timer is started based on an indication that one of the radio resource connection setup procedure and the radio resource connection re-configuration is completed.

14. The apparatus according to claim 13, wherein the indication comprises one of a radio resource connection setup completion message and a radio resource connection re-configuration completion message.

15. The apparatus according to claim 12, wherein the one of the radio resource connection setup procedure and the radio resource connection re-configuration procedure relates to a handover operation.

16. The apparatus according to claim 11, wherein the duration of the power preference indication timer is set based on information received from the communication network.

17. The apparatus according to claim 11, wherein the at least one memory including the computer program code is configured with the at least one processor, to cause the apparatus, based on an expiration of the power preference indication timer, to send a power preference indication message towards the network.

18. The apparatus according to claim 17, wherein the power preference indication message comprises a power-prefindication value, the powerprefindication value indicating that the apparatus is in one of a low power consumption mode and a normal power consumption mode.

19. The apparatus according to claim 11, wherein starting the power preference indication timer comprises restarting a T340 timer.

20. The apparatus according to claim 19, wherein the duration of the power preference indication timer is based on a duration of the T340 timer.

21. The apparatus according to claim 11, wherein the apparatus is further configured to at least:
   set a length of the power preference indication delay timer, the length of the power preference indication delay timer being based on a length of another delay timer in the resource control message.

* * * * *